United States Patent
Hirata et al.

(10) Patent No.: US 8,912,949 B2
(45) Date of Patent: Dec. 16, 2014

(54) ULTRA-SENSITIVE SYSTEM FOR MEASURING DISTANCE OR POSITION

(75) Inventors: Seiichiro Hirata, Nagaokakyo (JP); Nobuo Nakajima, Tokyo (JP); Shogo Ida, Rittoh (JP); Harumasa Hojo, Tokyo (JP)

(73) Assignees: The University of Electro-Communications, Tokyo (JP); Git Japan Incorporated, Rittoh-shi (JP); Sensorcomm Co., Ltd., Tokyo (JP); Seiichiro Hirata, Nagaokakyo-shi (JP); Sozaburo Ihara, Tokyo (JP)

( * ) Notice: Subject to any disclaimer, the term of this patent is extended or adjusted under 35 U.S.C. 154(b) by 358 days.

(21) Appl. No.: 13/395,551

(22) PCT Filed: Apr. 26, 2010

(86) PCT No.: PCT/JP2010/057377
§ 371 (c)(1), (2), (4) Date: Mar. 12, 2012

(87) PCT Pub. No.: WO2011/043091
PCT Pub. Date: Apr. 14, 2011

(65) Prior Publication Data
US 2012/0176272 A1    Jul. 12, 2012

(30) Foreign Application Priority Data

Oct. 9, 2009   (JP) .................................. 2009-235137

(51) Int. Cl.
  *G01S 13/08*   (2006.01)
  *G01S 5/14*    (2006.01)
  *G01S 13/87*   (2006.01)
  *G01S 13/82*   (2006.01)

(52) U.S. Cl.
  CPC ............... *G01S 13/878* (2013.01); *G01S 5/145* (2013.01); *G01S 13/82* (2013.01)
  USPC ........................................................... 342/118

(58) Field of Classification Search
  USPC ........................................................... 342/118
  See application file for complete search history.

(56) References Cited

U.S. PATENT DOCUMENTS

| | | | |
|---|---|---|---|
| 5,731,781 A * | 3/1998 | Reed | 342/135 |
| 7,408,504 B2 | 8/2008 | Kishimoto | |
| 2002/0181565 A1* | 12/2002 | Boyd et al. | 375/152 |
| 2010/0042845 A1* | 2/2010 | Kobayashi et al. | 713/180 |

FOREIGN PATENT DOCUMENTS

| | | |
|---|---|---|
| JP | 11-513787 | 11/1999 |
| JP | 2007-215085 A1 | 8/2007 |

OTHER PUBLICATIONS

International Search Report for International Application No. PCT/JP2010/057377 dated Aug. 3, 2010.

* cited by examiner

*Primary Examiner* — Timothy A Brainard
(74) *Attorney, Agent, or Firm* — Kratz, Quintos & Hanson, LLP

(57) ABSTRACT

It is an object of the present invention to provide a system with which 3-dimensional position can be accurately measured. Plural UWB transmitter-receivers (1), periodically transmitting PN codes of M system and preliminarily disposed on known positions are provided, a server (3) to synchronize the plural UWB transmitter-receivers (1) is provided, an RF tag (T), attached to a moving object (20) as to receive signals ($I_0$) synchronously and periodically transmitted from the UWB transmitter-receivers (1) and reflect the signals ($I_0$) adding inherent tag recognition signal, is provided, and the UWB transmitter-receiver (1) is composed as to obtain the distance to the moving object (20) attached with the RF tag (T) by synchronous summation and correlative calculation of the PN codes of M system reflected by the RF tag (T).

4 Claims, 6 Drawing Sheets

ULTRA-SENSITIVE SYSTEM FOR MEASURING DISTANCE OR POSITION

FIELD OF THE INVENTION

This invention relates to an ultra-sensitive system for measuring distance or position.

BACKGROUND ART

GPS is conventionally and widely used as a position (distance) measuring method.

However, it is difficult to receive signals from artificial satellites with high accuracy in buildings, underground concourses, etc. for weak electrical field.

One of the inventors of the present invention has been proposed several inventions on position measuring systems using GPS (refer to Patent document 1, for example).

PRIOR ART DOCUMENT

Patent Document

Patent document 1: U.S. Pat. No. 7,408,504

OUTLINE OF THE INVENTION

Problems to be Solved by the Invention

By the above invention of GPS position measuring system, weak signals from artificial satellites can be received even in buildings, underground concourses, etc.

However, 3-dimensional position orientation, for example, to decide on which floor the position of an object is, is quite difficult for GPS position measuring system.

Although an autonomous navigator, an acceleration sensor, a gyro, a geomagnetism sensor, etc. mounted on a walking person, is proposed, the position deviates within a short distance for accumulated errors.

Further, although an idea of distance measuring by UWB exists, this is hardly applied to practical use because UWB wave transmitted with legally acceptable power is extremely weak, further weakened when goes through walls and floors, and distance measuring becomes impossible.

Therefore, it is an object of the present invention, solving the above-described conventional problems, to provide a system with which position can be measured with super high sensitivity even in buildings, hospitals, stations, or underground concourses in which walls, floors, ceilings, and obstacles exist, and 3-dimensional position measuring can be easily conducted.

Means for Solving the Problems

Therefore, the ultra-sensitive system for measuring distance related to the present invention is provided with plural UWB transmitter-receivers, periodically transmitting PN codes of M system and preliminarily disposed on known positions, a server to synchronize the plural UWB transmitter-receivers, and an RF tag, attached to a moving object as to receive signals synchronously and periodically transmitted from the UWB transmitter-receivers and reflect the signals adding inherent tag recognition signal; and the UWB transmitter-receiver is composed as to obtain the distance to the moving object attached with the RF tag by synchronous summation and correlative calculation of the PN codes of M system reflected by the RF tag.

And, the ultra-sensitive system for measuring position related to the present invention is provided with plural UWB transmitter-receivers, periodically transmitting PN codes of M system and preliminarily disposed on known positions, a server to synchronize the plural UWB transmitter-receivers, and an RF tag, attached to a moving object as to receive signals synchronously and periodically transmitted from the UWB transmitter-receivers and reflect the signals adding inherent tag recognition signal; and the UWB transmitter-receiver is composed as to obtain the distances between the moving object attached with the RF tag and each of the plural UWB transmitter-receivers by synchronous summation and correlative calculation of the PN codes of M system reflected by the RF tag, further, the position of the moving object is calculated in the server or the UWB transmitter-receiver based on the distances.

And, the ultra-sensitive system for measuring distance related to the present invention is provided with plural UWB transmitters, periodically transmitting PN codes of M system and preliminarily disposed on known positions, a server to synchronize the plural UWB transmitters, and a freely movable UWB receiver, composed as to receive signals synchronously and periodically transmitted from the UWB transmitters and obtain the distances to the UWB transmitters by synchronous summation and correlative calculation of the received PN codes of M system.

And, the ultra-sensitive system for measuring position related to the present invention is provided with plural UWB transmitters, periodically transmitting PN codes of M system and preliminarily disposed on known positions, a server to synchronize the plural UWB transmitters is provided, and a freely movable UWB receiver, composed as to receive signals synchronously and periodically transmitted from the UWB transmitters, obtain the distances to the plural UWB transmitters by synchronous summation and correlative calculation of the received PN codes of M system, and calculate the self position based on the obtained distances.

Effects of the Invention

According to the present invention, it is possible to accurately know the position (distance) of persons or objects even in buildings, hospitals, stations, facilities, or underground concourses where many walls, floors, ceilings, and obstacles exist. Especially, "3-dimensional" positions (of person and objects) difficult to measure with conventional GPS measuring systems can be known with high accuracy. And, the present invention is an excellent invention artfully utilizing UWB (conventionally regarded as usable only for small range of extremely short distance). Further, the above-mentioned effect can be shown with UWB output under the legally restricted micro electric power.

EMBODIMENTS OF THE INVENTION

Figure 1:
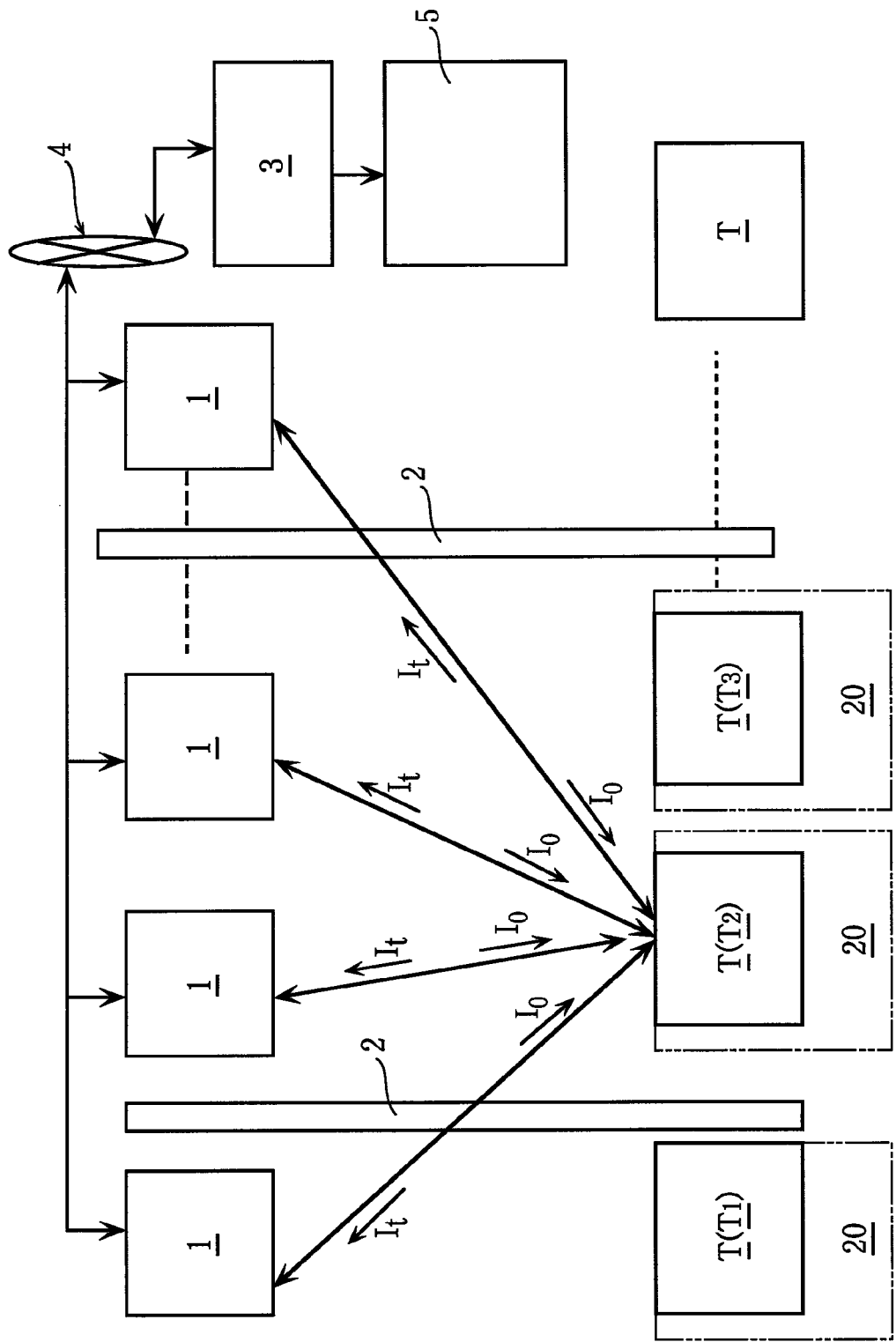
FIG. 1 A block diagram showing an embodiment of the present invention.

The present invention will now be described according to the embodiments shown in the drawings.

Figure 4:
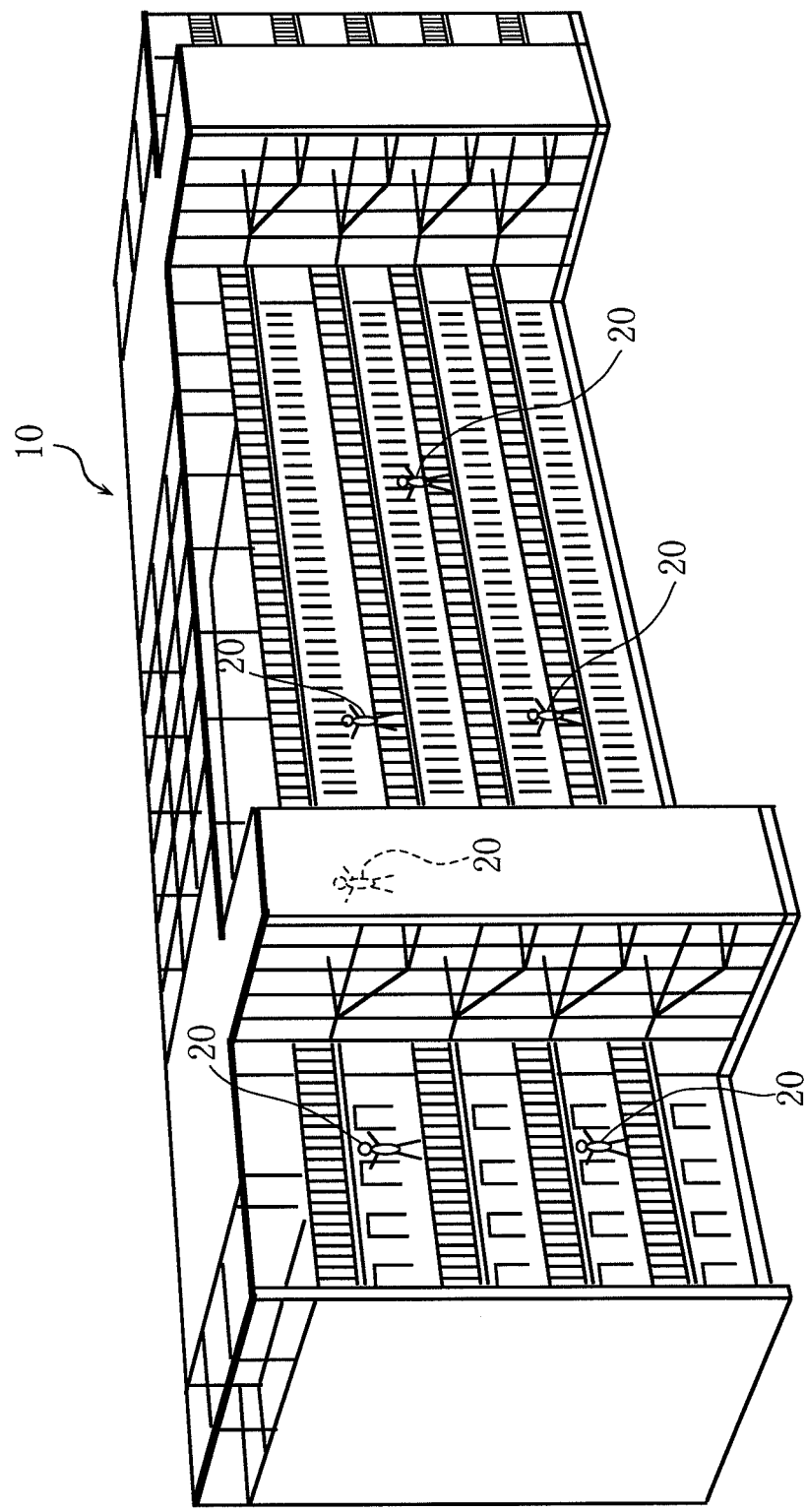
FIG. 4 A perspective view to explain a site to which the present invention is applied.
Figure 5:
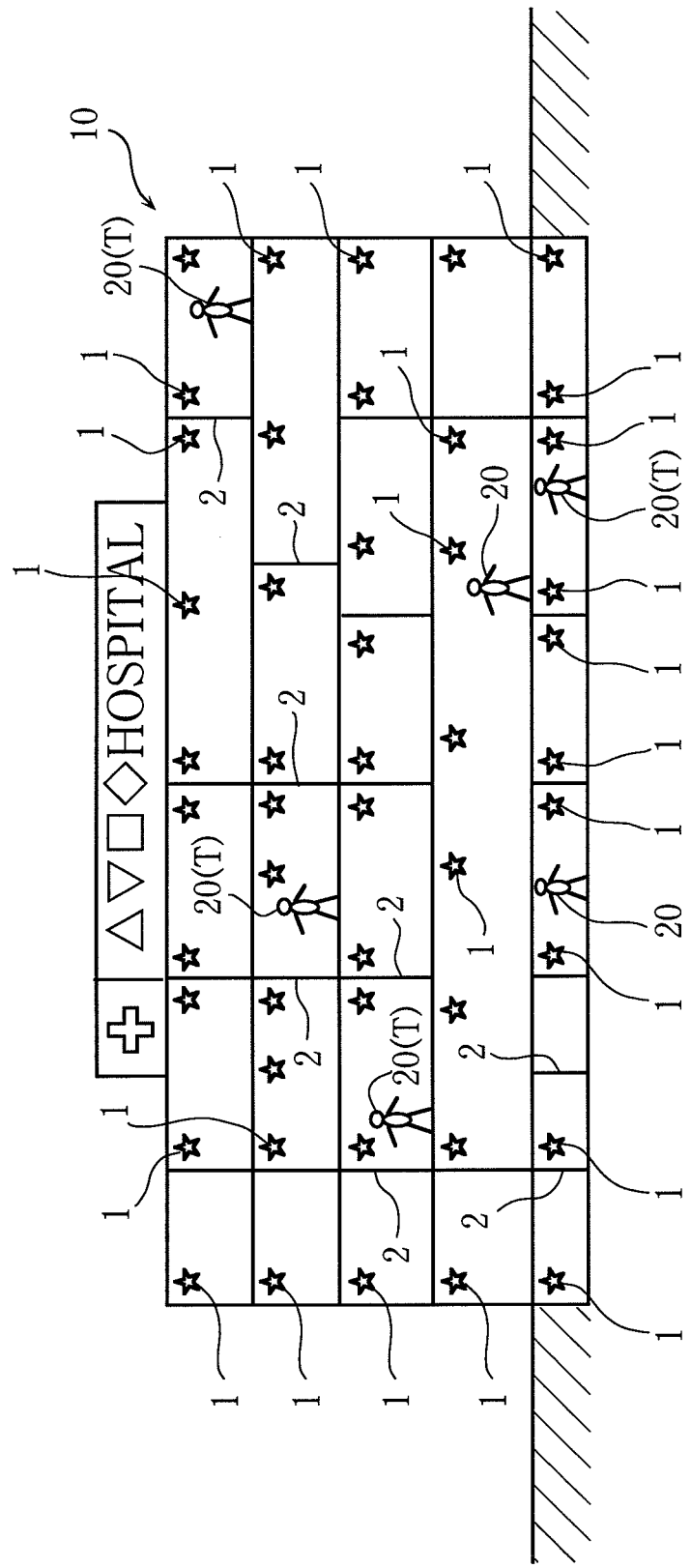
FIG. 5 A front view showing the site to which the present invention is applied.

FIG. 4 and FIG. 5 show a hospital 10 as an example of place to which an ultra-sensitive distance or position measuring system relating to the present invention. The hospital 10 is shown as to have 4 stories and a basement floor, and many (plural) UWB transmitter-receivers 1 are disposed on each of the floors of the hospital 10 as shown with star marks in FIG. 5. In the present invention, UWB means Ultra Wide Band.

Although the plural UWB transmitter-receivers 1 are disposed on each of the floors approximately uniformly in the front view shown in FIG. 5, the plural UWB transmitter-receivers 1 are disposed as scattered points 2-dimensionally and approximately uniformly in a top view of the hospital 1 (not shown in Figures). Further, it is desirable to shorten the mutual interval between the UWB transmitter-receivers 1 where a wall 2 of building exists. On the contrary, the mutual interval between the UWB transmitter-receivers 1 can be widened in a large lobby where the wall 2 does not exist. And, it is desirable to shorten the mutual interval in the basement.

Figure 6:
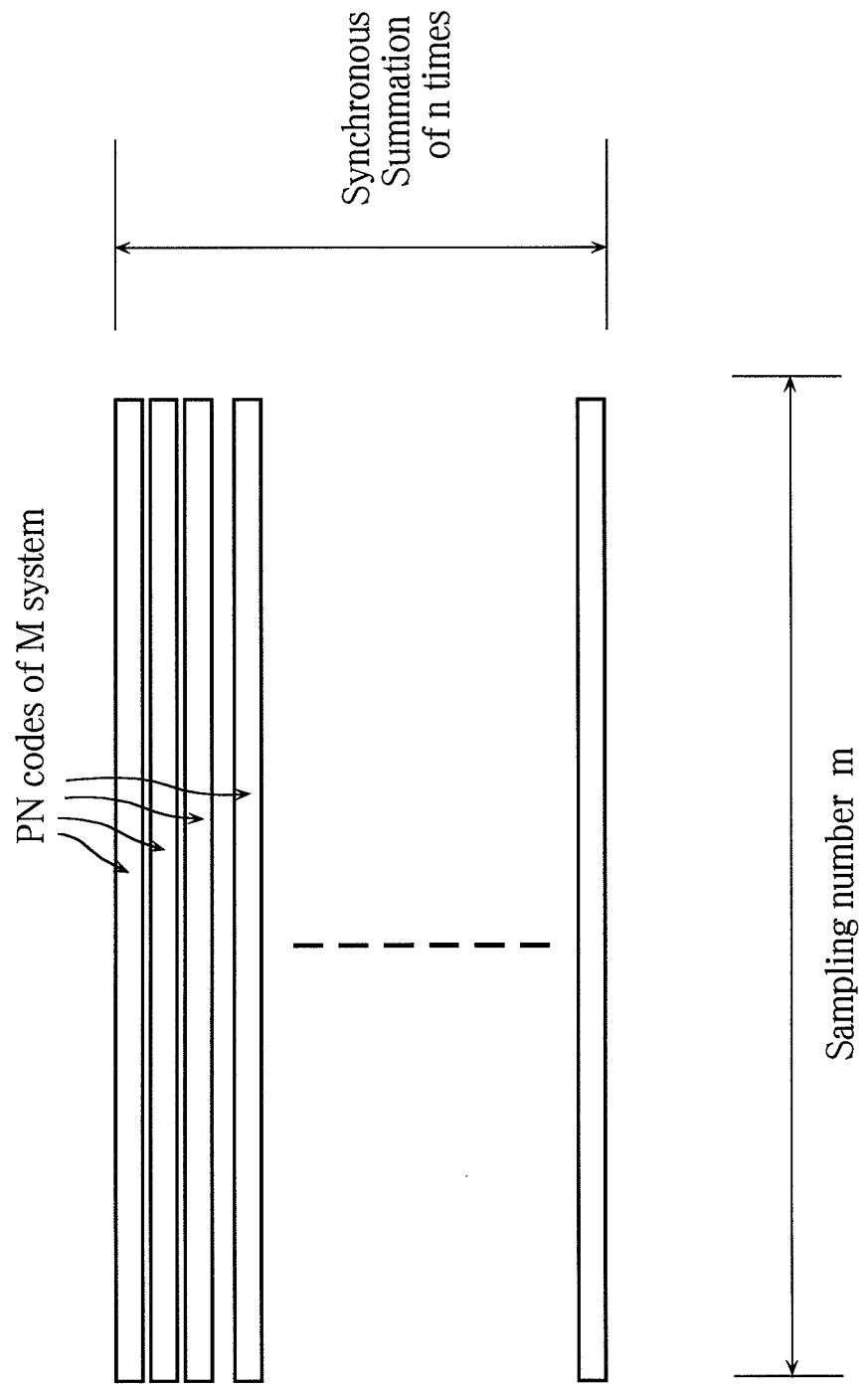
FIG. 6 An explanatory view of synchronous summation in the present invention.

In the embodiment shown in FIG. 1, the UWB transmitter-receivers 1 are preliminarily set on known positions, namely 3-dimensional positions in a place having the wall 2, to periodically transmit PN codes of M system (refer to FIG. 6).

A mark 3 represents a server to synchronize the plural UWB transmitter-receivers 1. The server 3 and the plural UWB transmitter-receivers 1 are mutually connected through a communication means 4 as to mutually transmit and receive.

A mark 5 represents a display (indicating means) which can indicate later-described tag positions. The display 5 is connected to the server 3. Although floors and ceilings are omitted and UWB transmitter-receivers 1 on upper and lower floors are not shown in FIG. 1, it is to be understood that they are disposed also in upper and lower directions with reference to FIG. 5.

Then, all of the UWB transmitter-receivers 1 are synchronized by synchronous signals transmitted from the server 3 through the communication means 4 to (periodically) transmit the PN codes of M system. RF tags T for UWB shown in FIG. 1 can receive the transmitted signal $I_0$. The RF tag T is set (attached) to moving objects 20 composed of persons such as doctors, nurses, or things such as medical equipments, clinical charts, etc.

The RF tag T receives the periodically transmitted signal $I_0$ with synchronization with the UWB transmitter-receivers 1 and reflects the signal $I_0$ adding tag identification signal (ID) proper to the signal $I_0$. This reflected signal is shown in FIG. 1 as It.

The plural UWB transmitter-receivers 1 conduct synchronous summation and correlative calculation on the reflected signal It provided with the PN codes of M system (refer to FIG. 6). The distance between the RF tag T and the UWB transmitter-receiver 1 can be obtained by the synchronous summation and correlative calculation in the UWB transmitter-receivers 1. That is to say, the distance to the moving object 20 with the RF tag T can be obtained.

Adding to the explanation further, as described above, the PN codes of M system are transmitted periodically for plural times (n times) by the electric wave of UWB, the UWB transmitter-receiver 1 receives the signal It reflected by the RF tag T, synchronous summation is conducted on the PN codes of M system demodulated on reception side (of the transmitter-receiver) for n times, then, correlative calculation is conducted (with sampling number m) to reduce inner heat noise for $1/\sqrt{mn}$. That is to say, signals through walls, floors, or ceilings embedded in noise can be raised from the noise.

When data X is x(n) (n=0:m−1), data Y is h(n) (n=0:m−1), and 0≤k≤m−1 with integer k, a formula for mutual correlative calculation is given as follows.

$$y(k) = 1/m \sum_{n=0}^{m-1} x(n)h(n-k) \bmod m \quad \text{[formula 1]}$$

h(n−k)mod m means conducting cyclic shift to the data on the point m.

y(0), y(1), y(2), ... y(m−1) is calculated. Adding number of data is m in the calculation of y(k). It is known that noise component is reduced by a ratio of $1/\sqrt{m}$ with adding of m times when the noise covering the data x(n) is Gaussian with statistical nature such as heat noise. This calculation is called correlative calculation (although there is generally known and used method using FFT as high-speed calculation for equivalent correlation calculation, a general calculating method is shown here to explain principles). And, when the absolute value of each of y(0), y(1), y(2), ... y(m−1) is the maximum value, the absolute value of y(mm) is a peak value of correlation (0≤mm≤m−1). mm in this case is called delay amount τ. And, obtaining the delay amount and the peak value y(mm) is called obtaining the peak value of correlation. When the data X is x(n) obtained by n times of synchronization of periodical signals, heat noise reduction amount is reduced by a ratio of $1/\sqrt{mn}$ with the correlative calculation. And, in the present invention, the PN code is x(n), the replica PN code is h(n), n is the number of time of the synchronous summation, m is the number of samples for one period of the PN code signal, and the heat noise reduction amount is reduced by the ratio of $1/\sqrt{mn}$.

For example, when m=2046 and n=10000, the heat noise is reduced to $1/\sqrt{(2046 \times 10000)}$.

As shown in FIG. 5, even if the RF tag T for UWB exists in 3-dimensional space and blocked by the wall 2, floor, and ceiling, the distance between the UWB transmitter-receiver 1 and the moving object 20 to which the tag T is attached can be obtained by the UWB transmitter-receiver 1 through the wall, the floor, and the ceiling (the signal can be raised from the noise).

Although transmission, reception, and reflection are shown with the RF tag $T_2$ second from the left as the RF tag T in FIG. 1, the reflected signal It may be reflected directly (straight) from the RF tag T, and preferable to be amplified by the RF tag T and reflected when desired.

Then, as shown in FIG. 1, the position of the RF tag $T_2$, namely the moving object 20 is calculated in the server 3 or the UWB transmitter-receiver 1 based on distances (obtained as described above) between each of the UWB transmitter-receivers 1 on 4 known 3-dimensional positions and the RF tag $T_2$. The position of the moving object 20 is measured and indicated on the display 5 thereby.

Figure 2:
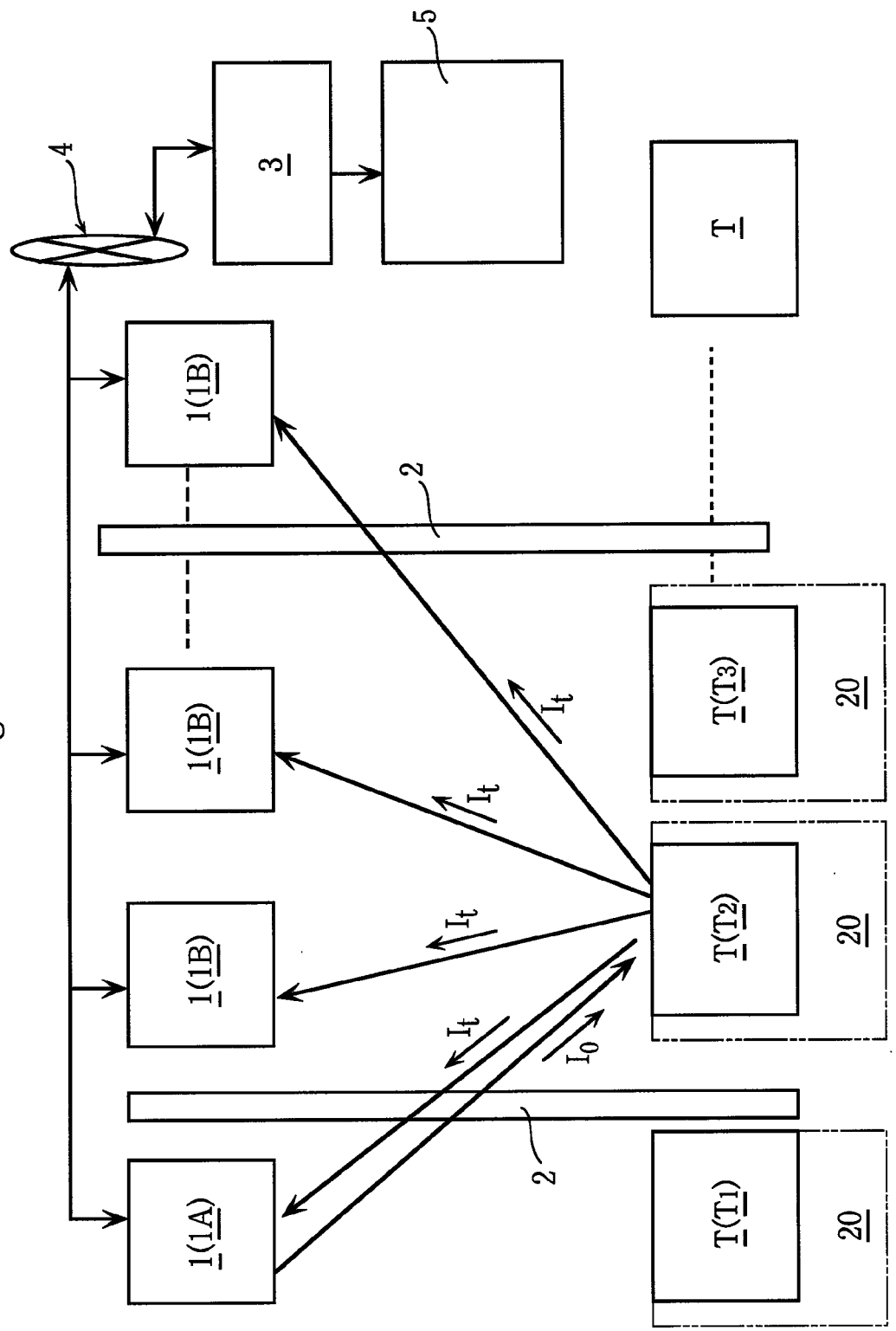
FIG. 2 A block diagram showing another embodiment of the present invention.

Next, FIG. 2 shows another embodiment of the present invention. Different points from that of FIG. 1, PN codes of M system is periodically transmitted only from one transmitter-receiver 1A, and other 3 transmitter-receivers 1B conduct only reception. The PN code of M system is periodically transmitted from one transmitter-receiver 1A for plural times. The RF tag $T_2$ receives the transmitted signal $I_0$, adds tag identification signal ID to the received signal $I_0$, and reflects the received signal $I_0$ directly or with amplification. And the signal It is received by the 4 transmitter-receivers 1A and 1B (in the Figures). And, the tag identification code ID is identified.

By conducting synchronous summation and correlative calculation in each of the 4 transmitter-receivers 1A and 1B, the distance between the RF tag $T_2$ and each of the 4 transmitter-receivers 1A and 1B can be obtained. The 3-dimensional position (3-dimensional coordinates) of the RF tag $T_2$ is obtained by the (obtained) 4 distances because the 3-dimensional positions of the 4 transmitter-receivers 1A and 1B are known.

Although one transmittable UWB transmitter-receiver 1A and 3 (or more) UWB transmitter-receivers 1B for reception are shown in FIG. 2, one transmittable UWB transmitter-receiver 1A is provided for each group composed of predetermined number of transmitter-receivers when many transmitter-receivers 1 are disposed as shown in FIG. 5. That is to say, as a whole, plural transmittable UWB transmitter-receivers 1A are set as scattered points with relatively large intervals, and the UWB transmitter-receivers 1B for reception (of unit number more than 3 times of that of the transmitter-receivers 1A) are set as scattered points with relatively small intervals.

Figure 3:
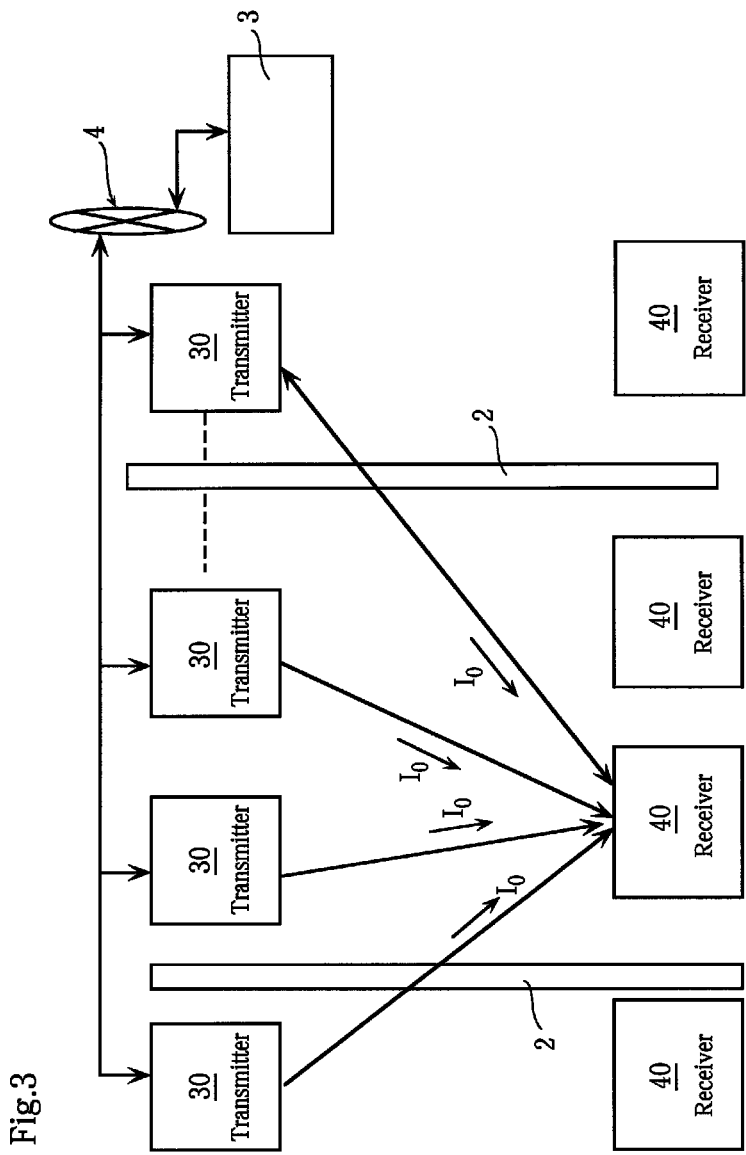
FIG. 3 A block diagram showing a further embodiment of the present invention.

Next, FIG. 3 shows another embodiment of the present invention provided with plural UWB transmitters 30 set on known positions to synchronously transmit the PN code of M system, a server 3 to synchronize the plural UWB transmitters 30, and a movable (portable) UWB receiver 40 to receive the periodically transmitted signal $I_0$ with synchronization of the UWB transmitters 30.

The UWB receiver 40 is provided with an electronic circuit to conduct synchronous summation and correlative calculation on the PN code of M system received from the UWB transmitters 30 as to obtain distances to the plural (preferably 4 or more) UWB transmitters 30.

The UWB receiver 40 is composed to calculate self position based on the distances obtained as described above. And, although not shown in Figures, the UWB receiver 40 is provided with a display (indicating screen). The UWB receiver 40 is very easily made compact advantageously. And, the UWB receiver 40 can be used independently or with GPS as to correspond to places and purposes.

In FIG. 2, the distance between the transmitter-receiver 1A and the RF tag $T_2$ and the sum of distances between the RF tag $T_2$ and other transmitter-receivers 1B are calculated to obtain 3 patterns of the sums. 3-dimensional coordinates (3-dimensional position) of the RF tag $T_2$ are obtained by calculation of intersection of elliptic spheres. It is also preferable to decide an elliptic sphere of constant sum by obtaining not the distances between the RF tag $T_2$ and the transmitter-receivers 1 but the sum to make an intersection of two or more elliptic spheres the 3-dimensional coordinates obtained by the RF tag $T_2$.

Although it is described that the set positions of the transmitter-receivers 1, 1A, 1B, and the UWB transmitter 30 are known in each of the above-described embodiments, it is preferable to preliminarily make the server 3 memorize the known 3-dimensional set positions. It is also possible to make transmitter-receivers 1, 1A, 1B, and the UWB transmitter 30 themselves memorize the known 3-dimensional positions.

And, as described above, it is also preferable to make the RF tag T for UWB, including amplifying circuit and battery, amplify and reflect.

In the hospital 10 shown in FIG. 4 and FIG. 5, it is desirable that the present site of a doctor, etc. (moving object) can be 3-dimensionally and immediately identified when emergency patients occur. And, the usage of the present invention is wide because the moving object 20 composed of a person or an object can be swiftly identified in buildings such as multi-story buildings, stations, shopping centers, in facilities, and in underground concourses. And, the present invention makes possible 3-dimensional position measuring considered extremely difficult by position measuring system by conventional GPS, the usage is wide as described above, and it is preferable to connect to 2-dimensional GPS when desired.

The present invention, artfully making UWB conventionally considered too weak and hardly usable for position measuring system highly applicable, is an innovative invention to pioneer new usage.

EXPLANATION OF THE MARKS

1 A UWB transmitter-receiver
3 A server
20 A moving object
30 A UWB transmitter
40 A UWB receiver
T RF tag for UWB
$I_0$ signal
It reflected signal

The invention claimed is:

1. An ultra-sensitive system for measuring distance, comprising:
   plural UWB transmitter-receivers (1) periodically transmitting PN codes of M system and preliminarily disposed on known positions;
   a server (3) to synchronize the plural UWB transmitter-receivers (1); and
   an RF tag (T) attached to a moving object (20) as to receive signals ($I_0$) synchronously and periodically transmitted from the UWB transmitter-receivers (1) and reflect the signals ($I_0$) adding inherent tag recognition signal,
   wherein the UWB transmitter-receiver (1) is composed as to obtain the distance to the moving object (20) attached with the RF tag (T) by synchronous summation and correlative calculation of the PN codes of M system reflected by the RF tag (T).

2. An ultra-sensitive system for measuring position, comprising:
   plural UWB transmitter-receivers (1) periodically transmitting PN codes of M system and preliminarily disposed on known positions;
   a server (3) to synchronize the plural UWB transmitter-receivers (1); and
   an RF tag (T) attached to a moving object (20) as to receive signals ($I_0$) synchronously and periodically transmitted from the UWB transmitter-receivers (1) and reflect the signals ($I_0$) adding inherent tag recognition signal,
   wherein the UWB transmitter-receiver (1) is composed as to obtain the distances between the moving object (20) attached with the RF tag (T) and each of the plural UWB transmitter-receivers (1) by synchronous summation and correlative calculation of the PN codes of M system reflected by the RF tag (T), and
   wherein the position of the moving object (20) is calculated in the server (3) or the UWB transmitter-receiver (1) based on the distances.

3. An ultra-sensitive system for measuring distance, comprising:
   plural UWB transmitters (30) periodically transmitting PN codes of M system and preliminarily disposed on known positions;

a server (3) to synchronize the plural UWB transmitters (30); and a freely movable UWB receiver (40) composed as to receive signals ($I_0$) synchronously and periodically transmitted from the UWB transmitters (30) and obtain the distances to the UWB transmitters (30) by synchronous summation and correlative calculation of the received PN codes of M system.

4. An ultra-sensitive system for measuring position, comprising:

plural UWB transmitters (30) periodically transmitting PN codes of M system and preliminarily disposed on known positions;

a server (3) to synchronize the plural UWB transmitters (30); and a freely movable UWB receiver (40) composed as to receive signals ($I_0$) synchronously and periodically transmitted from the UWB transmitters (30), obtain the distances to the plural UWB transmitters (30) by synchronous summation and correlative calculation of the received PN codes of M system, and calculate the self position based on the obtained distances.

* * * * *